US011770047B2

(12) United States Patent
Tyshko et al.

(10) Patent No.: US 11,770,047 B2
(45) Date of Patent: Sep. 26, 2023

(54) POWER GRID STABILIZATION SYSTEM UTILIZING TWO GENERATORS MECHANICALLY LINKED VIA CONTINUOUS VARIABLE TRANSMISSION

(71) Applicants: Alexey Tyshko, Coatesville, PA (US); Nataliya Kulichenko, Vienna, VA (US)

(72) Inventors: Alexey Tyshko, Coatesville, PA (US); Nataliya Kulichenko, Vienna, VA (US)

( * ) Notice: Subject to any disclaimer, the term of this patent is extended or adjusted under 35 U.S.C. 154(b) by 1013 days.

(21) Appl. No.: 16/201,965

(22) Filed: Nov. 27, 2018

(65) Prior Publication Data
US 2019/0280557 A1 Sep. 12, 2019

Related U.S. Application Data

(60) Provisional application No. 62/641,153, filed on Mar. 9, 2018.

(51) Int. Cl.
| | | |
|---|---|---|
| H02K 7/116 | (2006.01) | |
| F16H 15/38 | (2006.01) | |
| H02K 7/18 | (2006.01) | |
| H02K 16/00 | (2006.01) | |
| H02K 51/00 | (2006.01) | |
| F01D 15/10 | (2006.01) | |

(52) U.S. Cl.
CPC ........... *H02K 7/1163* (2013.01); *F01D 15/10* (2013.01); *F16H 15/38* (2013.01); *H02K 7/116* (2013.01); *H02K 7/1823* (2013.01); *H02K 16/00* (2013.01); *H02K 51/00* (2013.01)

(58) Field of Classification Search
CPC .. H02K 7/1163; H02K 7/116; H02K 7/12823; H02K 7/1823; H02K 16/00; H02K 51/00; F01D 15/10; F16H 15/38
See application file for complete search history.

(56) References Cited

U.S. PATENT DOCUMENTS

| | | |
|---|---|---|
| 3,609,426 A | 9/1971 | Gaul et al. |
| 6,240,337 B1 | 5/2001 | Marr, Jr. et al. |
| 6,566,775 B1 | 5/2003 | Fradella |
| 6,720,674 B1 | 4/2004 | Gabrys |
| 6,788,029 B1 | 9/2004 | Gabrys |
| 6,794,776 B1 | 9/2004 | Gabrys |
| 6,794,777 B1 | 9/2004 | Fradella |
| 6,825,588 B2 | 11/2004 | Gabrys et al. |
| 6,995,529 B2 | 2/2006 | Sibley |

(Continued)

*Primary Examiner* — Joseph Ortega
(74) *Attorney, Agent, or Firm* — Crowe & Dunlevy, P.C.

(57) ABSTRACT

A system and method for compensating for the changing power requirements of an electrical grid. A first generator is mechanically linked to a turbine and electrically linked to a power grid, such that the generator converts rotational energy into electrical energy to supply the power grid. The rotor of the generator is mechanically linked to the rotor of one or more additional generators, not connected to a turbine or the grid, via a continuously variable transmission. The turbine is maintained at optimal running speed. When the generator produces more electrical energy than required by the power grid, mechanical energy from the rotor is transmitted to the rotors of the additional generators. When the power grid requires more energy than generator produces, as the turbine runs at optimal efficiency, mechanical energy from the rotors of the additional generators is transmitted to the rotors of the first generator.

10 Claims, 6 Drawing Sheets

(56) References Cited

U.S. PATENT DOCUMENTS

| | | |
|---|---|---|
| 7,042,108 B2 | 5/2006 | Farkas |
| 7,071,581 B2 | 7/2006 | Eisenhaure et al. |
| 7,573,144 B1 | 8/2009 | Saban et al. |
| 7,633,172 B2 | 12/2009 | Kalev et al. |
| 7,633,248 B1 | 12/2009 | Williams |
| 8,030,787 B2 | 10/2011 | Kalev |
| 2002/0060500 A1 | 5/2002 | Lafferty |
| 2003/0102672 A1 | 6/2003 | King et al. |
| 2003/0155831 A1 | 8/2003 | Gabrys et al. |
| 2004/0207266 A1 | 10/2004 | Abel et al. |
| 2009/0189456 A1 | 7/2009 | Skutt |
| 2009/0200809 A1 | 8/2009 | Saban et al. |
| 2012/0129639 A1* | 5/2012 | Novikov ................ H02K 7/116 475/5 |
| 2017/0145925 A1* | 5/2017 | Kusumi .................... F02C 6/18 |
| 2018/0298777 A1* | 10/2018 | Nguyen .................... F02C 7/36 |

* cited by examiner

1 – Boiler
2 – High Pressure Steam
3 – Low Pressure Steam
4 – Turbine
5 – Generator 1
6 – Electrical output
7 – Condenser
8 – CVT
9 – Generator 2

POWER GRID STABILIZATION SYSTEM UTILIZING TWO GENERATORS MECHANICALLY LINKED VIA CONTINUOUS VARIABLE TRANSMISSION

CROSS-REFERENCE TO RELATED APPLICATION(S)

The present application claims priority to U.S. Provisional Patent Application No. 62/641,153 filed on Mar. 9, 2018, entitled "Power Grid Stabilization System Utilizing Two Generators Mechanically Linked Via Continuous Variable Transmission" the entire disclosure of which is incorporated by reference herein.

BACKGROUND OF THE INVENTION

The segment of the renewable power is growing fast replacing traditional sources such as coal fired power plants. However, renewable power sources, such as solar and wind energy, are dependent upon environmental conditions. The power they provide to the grid is subjected to fluctuation. Furthermore, power consumption on the user end may fluctuate depending on the day, weather, time etc.

Due to the intermittency of renewables and changing loads, baseload generating sources must be able to react quickly to keep the power grid stable by producing or absorbing additional to baseload power. However, baseload generating sources, such coal-fired steam generator plants or nuclear power plants are most efficient when operating at an optimal fixed power output. Power regulation, based on changing the high-pressure steam flow to the turbine, produces output power with lower efficiency. Changing steam parameters takes some time and decreases total power plant efficiency resulting in increase of cost of energy and carbon footprint. Regulation time takes seconds or tenths of seconds. Turning on backup gas turbine may take up to 30 seconds. Fast, short variations of the load may be absorbed by rotational machinery (generator plus turbine) stored energy causing changing of the mechanical energy resulting in the rotational speed and phase variations. Higher load variations may cause unacceptable frequency and phase change deregulating grid stability.

Due to increasing share of renewable energy sources many traditional power plants, such as coal-fired steam power plants, are decommissioning either as power plant or partly decommissioning one or more of their boiler and turbine/generator units. Those units are expensive and difficult to decommission, dismantle, move or disassemble.

Based on the foregoing, there is a need in the art for a fast acting power variation stabilization system operating with the baseload generating source and capable of producing on demand extra power for the increase in the grid load or absorbing excessive power for short period of time, while keeping the baseload generating source operating at the highest efficiency point. What may be further desired is a stabilization system which utilizes already existing components which would otherwise be decommissioned.

SUMMARY OF THE INVENTION

A voltage compensation system and method is provided. In an embodiment, the system comprises at least one generator connected to a turbine and configured to convert mechanical energy from the turbine into electrical energy for a power grid. In an embodiment, the turbine is maintained at its designed level of maximum efficiency.

In an embodiment, the generator which is connected to the turbine and the power grid has a rotor. The rotor of that generator is connected to the rotors of one or more additional generators via one or more continuously variable transmissions. In an embodiment, the one or more additional generators are not connected to a turbine or to the power grid.

In an embodiment, when the power grid requires less electrical power than the generator produces, when being driven by the turbine operating at maximum efficiency, mechanical energy is transferred from the rotor of the generator to the rotors of the additional generators via the continuously variable transmissions. The transferred energy is stored as mechanically energy in the rotating rotors of the additional generators.

In an embodiment, when the power grid requires more electrical power than the generator produces, when being driven by the turbine operating at maximum efficiency, mechanical energy is transferred to the rotor of the generator from the rotors of the additional generators via the continuously variable transmissions.

BRIEF DESCRIPTION OF THE DRAWINGS

For a more complete understanding of the present invention, the objects and advantages thereof, reference is now made to the ensuing descriptions taken in connection with the accompanying drawings briefly described as follows.

DETAILED DESCRIPTION OF PREFERRED EMBODIMENTS

Figure 1:
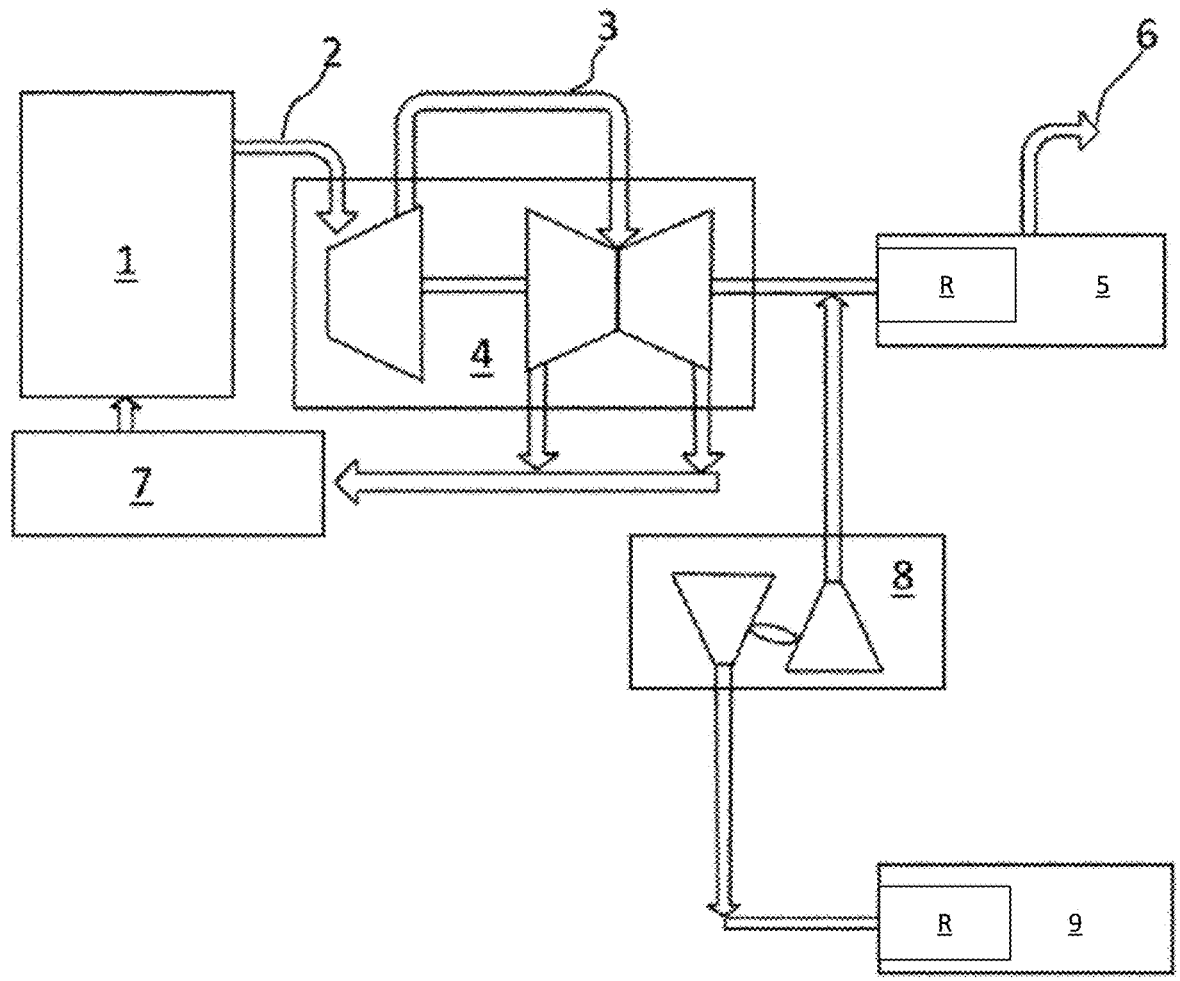
FIG. 1 is a schematic view of the power grid stabilization system according to an embodiment of the present invention.

Preferred embodiments of the present invention and their advantages may be understood by referring to FIGS. 1-6, wherein like reference numerals refer to like elements.

In reference to FIGS. 1, an embodiment of a power grid stabilization system is depicted. In the embodiment, two generators are provided. A first generator 5 is provided in a boiler 1 and steam turbine 4 system. A second generator 9 is provided, separate from the boiler and steam turbine system of the first generator. In an embodiment, the second generator 9 may be part of a boiler system which has been decommissioned or is no longer in use.

In reference to FIG. 1, in an embodiment, the first generator 5 is connected to the power grid via power outlet 6, and the second generator 9 is mechanically linked to the first generator 5 via a continuously variable transmission (CVT) 8. The CVT 8 provides a mechanical energy exchange between the first generator 5 and the second generator 9. The embodiment allows for the boiler and steam turbine system to continually run at their optimal efficiency configuration. When the grid requires less power, the CVT deaccelerates the first generator by transferring mechanical energy to the second generator to be stored. When the grid requires more power, the CVT transfers the mechanical energy stored by the second generator to the first generator, without having to change the parameters of the boiler and steam turbine system.

In an embodiment, a governor is provided to regulate the speed of the turbine connected to the first generator. Said governor may be a nozzle governor, bypass governor, or combination governor, as known in the art to keep the turbine rotating at a standard speed. The standard speed corresponds to the requirements of the power grid. In an example, the power grid may require a frequency of 60 Hz or 50 Hz. However, the required frequency may vary depending on the location and/or requirements of the grid.

Figure 2:
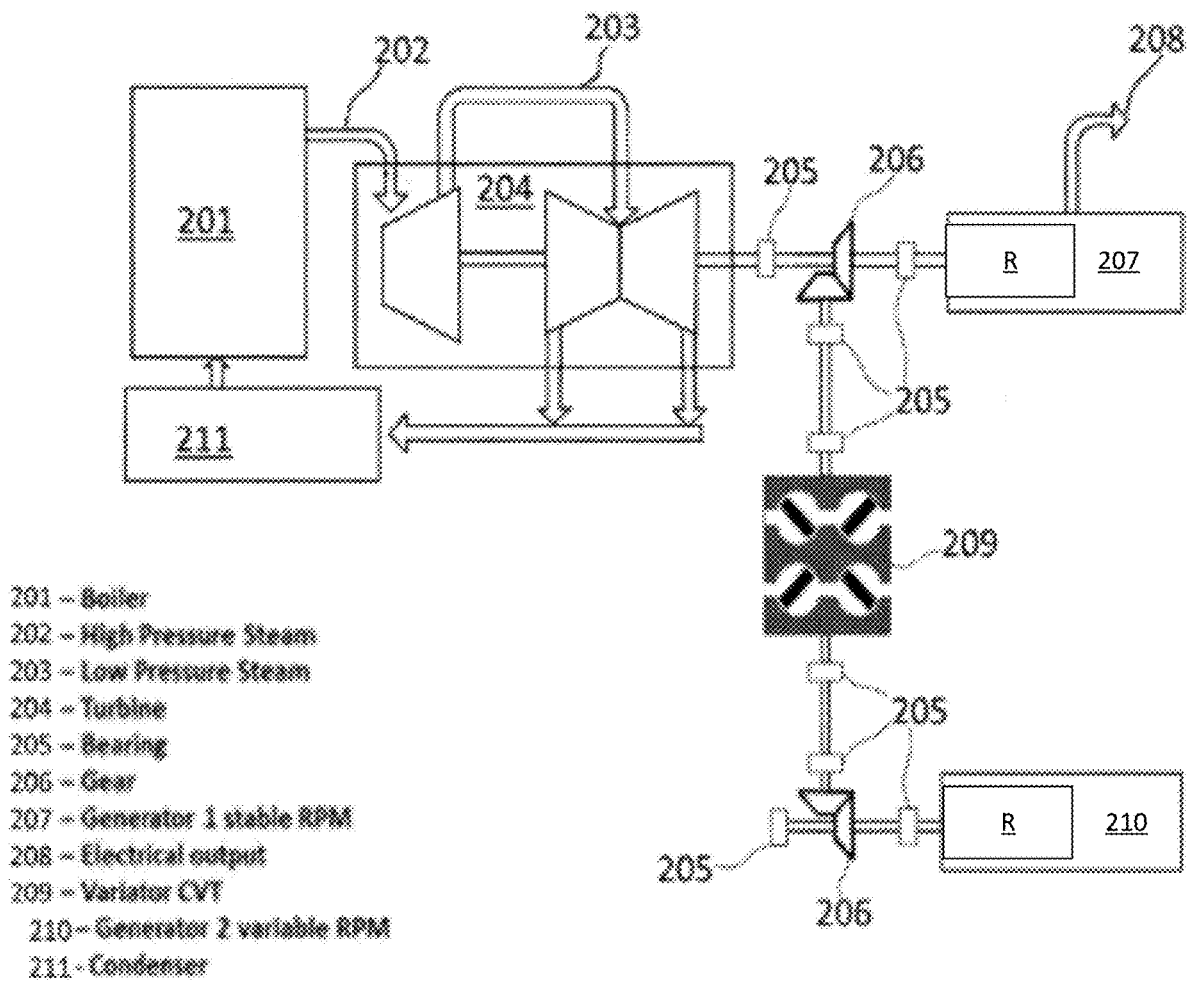
FIG. 2 is a schematic view of the power grid stabilization system according to an embodiment of the present invention.

In reference to FIG. 2, an embodiment of a power grid stabilization system is depicted. In the embodiment, two generator preferable design is provided. A first generator 207 is provided and powered by steam turbine 204. The steam turbine is fed from the boiler 201 via high pressure line 202 and low pressure line 203. The condenser 211 returns water vapor from turbine 204 back to the boiler 201. Bearings 205 support all rotating parts. Electrical link 208 connects generator 207 to the switchboard and transmission line (not shown). A second generator 210 is provided separate from the boiler and steam turbine system of the first generator 207. In an embodiment, the second generator 210 may be part of a boiler turbine/generator system which has been decommissioned or is no longer in use. Second generator 210 is mechanically linked to the first generator 207 via Continuous Variable Transmission CVT 209 and set of gears 6 rated to the maximum transferred power.

Figure 4A:
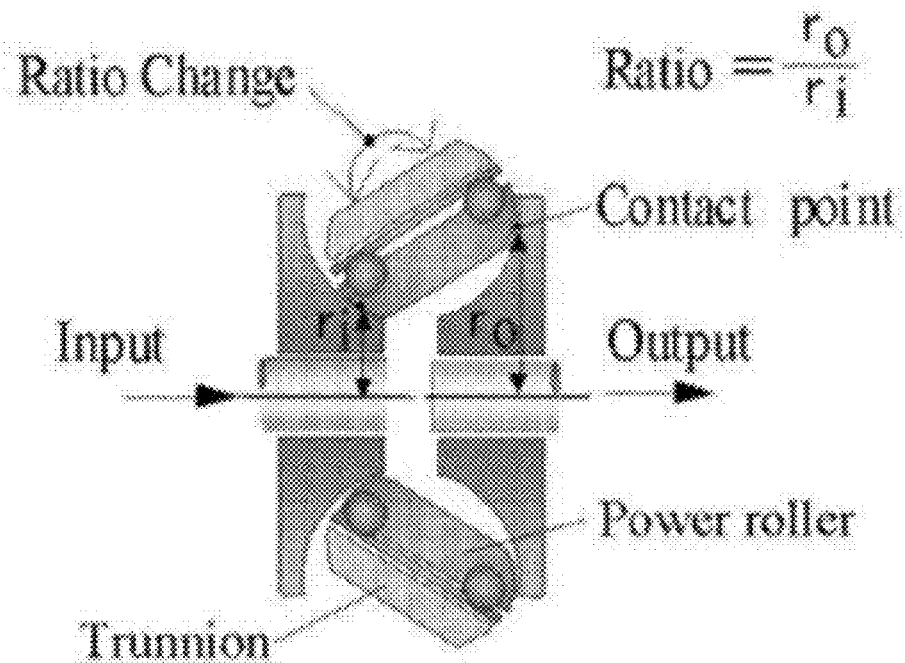
FIG. 4A is a perspective view of the continuous variable transmission according to an embodiment of the present invention.
Figure 4B:
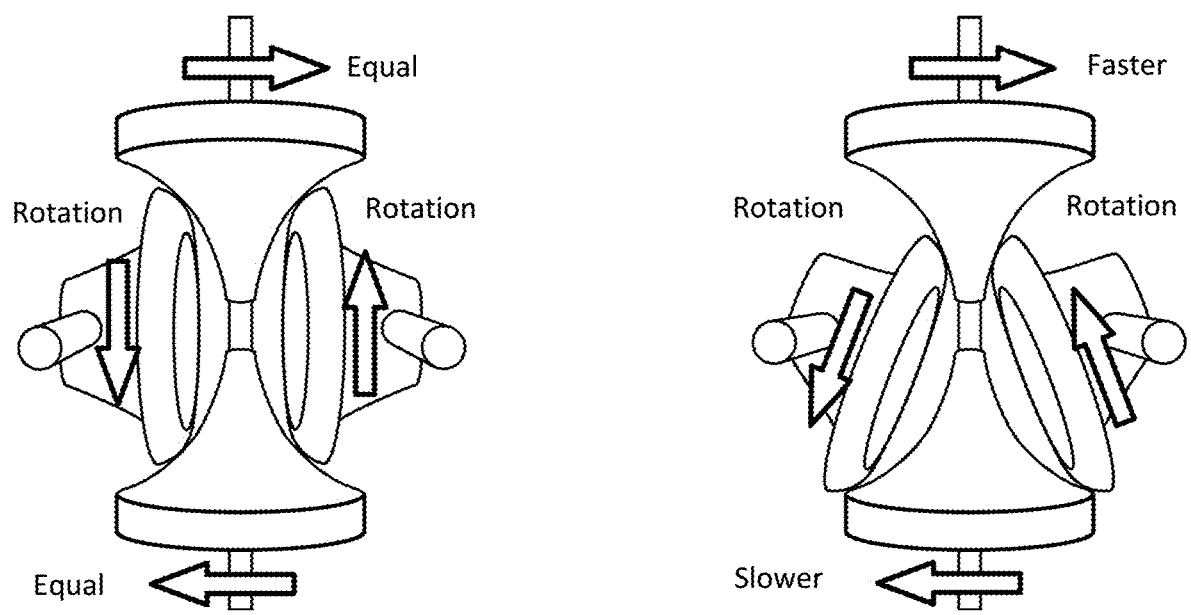
FIG. 4B is a perspective view of the continuous variable transmission according to an embodiment of the present invention.

With further reference to FIG. 2, in an embodiment, the turbine 201 and first generator 207 are rotating with the fixed speed (RPM) needed to generate standard 50 Hz or 60 Hz AC voltage depending on the country standard and providing required power with the highest efficiency. The second generator 210 has kinetic power stored proportional to the square of RPM. Maximum stored energy corresponds to the maximum rated RPM, and in an example of using a standard generator identical to first generator 207, the maximum speed is the same 3000 RPM or 3600 RPM for 50 Hz or 60 Hz grid, respectively. When the RPM drops to ½ of maximum value stored, the energy drops to ¼ of maximum value. In an embodiment, the recommended median is near 62% of maximum RPM, thus providing +/−40% of maximum stored energy available for injecting in the grid on demand, or for absorbing without changing the turbine and first generator RPM, allowing them to continue operating with the maximum efficiency. The control system analyzes the output voltage and current of the first generator and produces signals adjusting excitation of the first turbine and CVT ratio to redirect energy flow between two generators. When the grid requires less power than the turbine produces, the CVT redirects this excessive power (as illustrated in FIG. 4B) from the first generator by transferring mechanical energy to the second generator to be stored. When the grid requires more power, the CVT transfers the mechanical energy stored by the second generator to the first generator, without having to change the parameters of the boiler and steam turbine system. Maximum power flowing between two generators is limited by the CVT capability. Known CVTs such as Torotrak are capable of transferring power up to 900 kW per single unit.

In an embodiment, the power flow between the main or first generator and the grid is monitored by a controller continuously measuring generated voltages and currents, their amplitudes and phases. Said monitoring controllers are known in the art and are capable of real-time monitoring and controlling high power generation systems (as exemplified in FIG. 5).

Maximum power flowing between two generators is limited by the CVT capability. Known CVTs are capable of transferring power 300 kW to 900 kW with the RPM ratio 1 to 6. Combination of multiple CVT units, operating in parallel, allows proportionally increase transferred power to the grid and back. In reference to FIGS. 4A and 4B, example CVTs are illustrated.

In an example, the first generator rotates at a fixed speed (RPM) to generate a standard 50 Hertz (Hz) or 60 Hz alternating current (AC) voltage. However, the fixed speed may vary depending on the location and instituted requirements of frequency and voltage.

Figure 3:
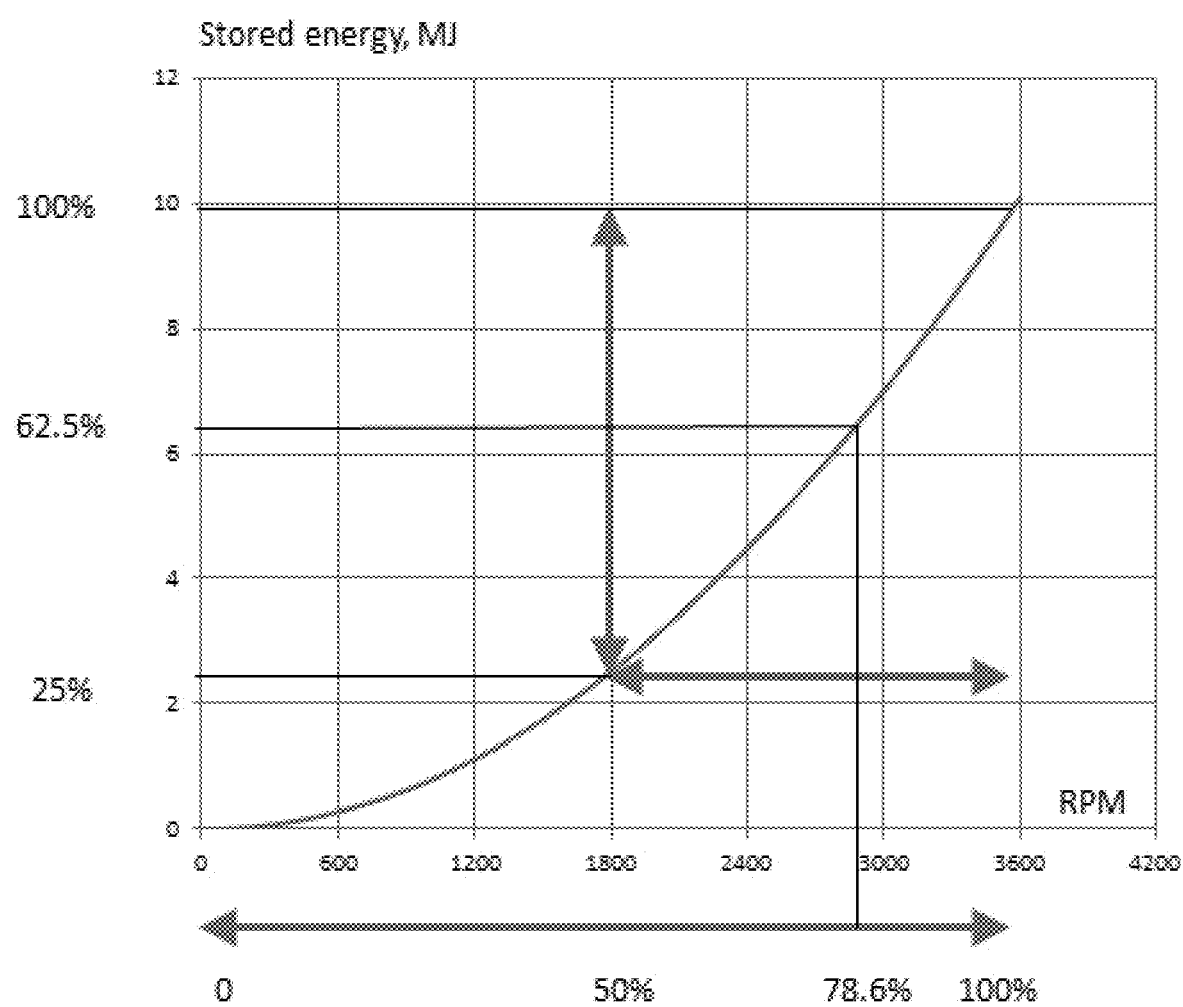
FIG. 3 is a graphical representation of the energy stored in the rotation of a generator rotor according to an embodiment of the present invention.

With reference to FIG. 3, a graphical representation of stored energy vs rotations per minute (RPM) is shown. A variation of 10 megajoules (MJ) maximum flywheel energy storage (generator rotor (R)) from 3600 rpm (100% rpm) down to 1800 rpm (50% rpm) releases 100%−25%=75% of the maximum stored energy or 7.5 MJ. The large mass of the rotors (R) provided in the generators allow for a large angular momentum value, and therefore energy loss due to friction, counter to the rotation of the rotor (R), is minimized compared to the other small mass/moment flywheels used with the high speed of rotation, in most cases the preferable embodiment uses both first and second generators rotational parts or rotors (R) as flywheels.

Figure 5:
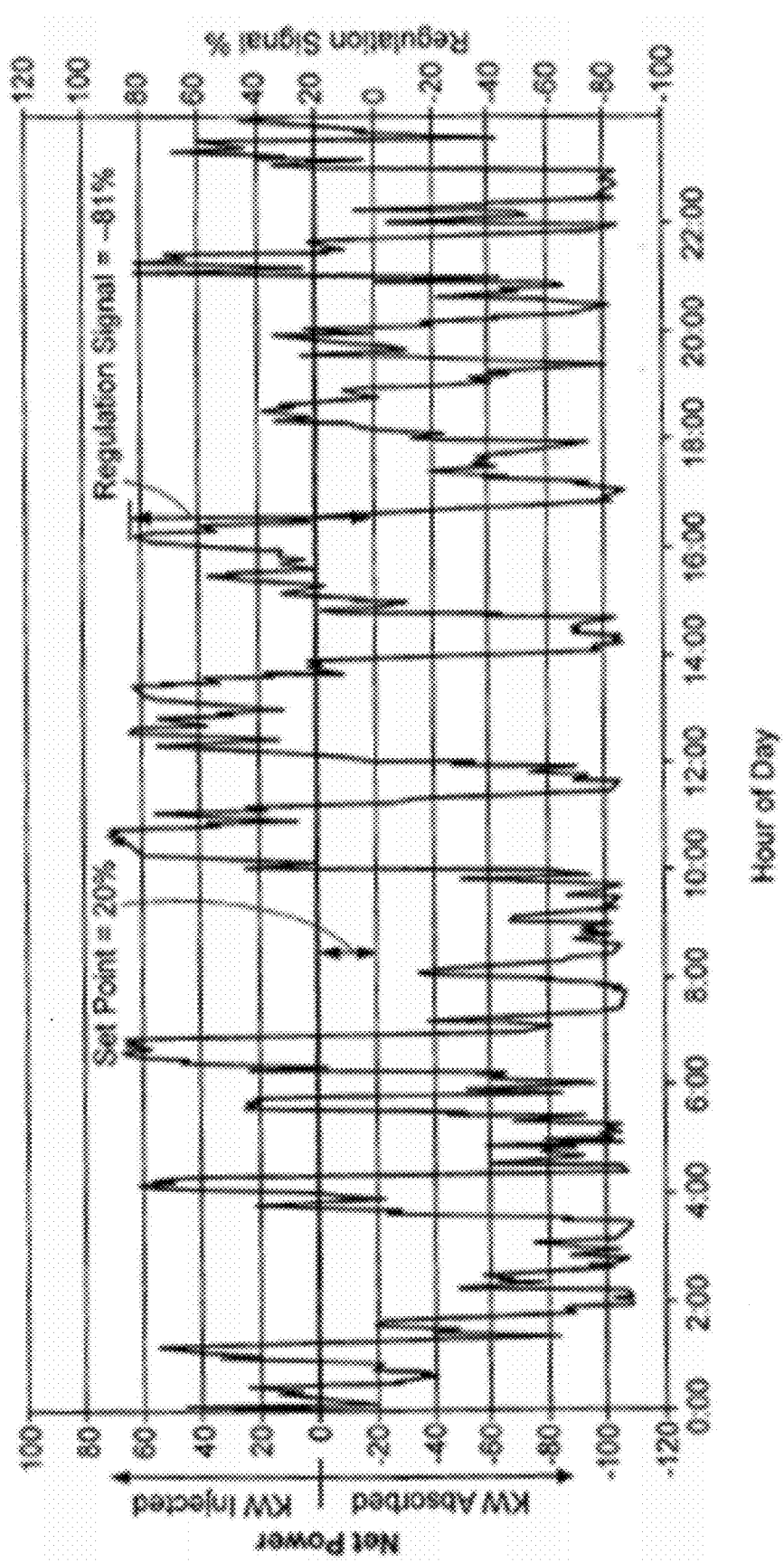
FIG. 5 is a graphical representation of the fluctuating energy requirements of a power grid according to an embodiment of the present invention.
Figure 6:
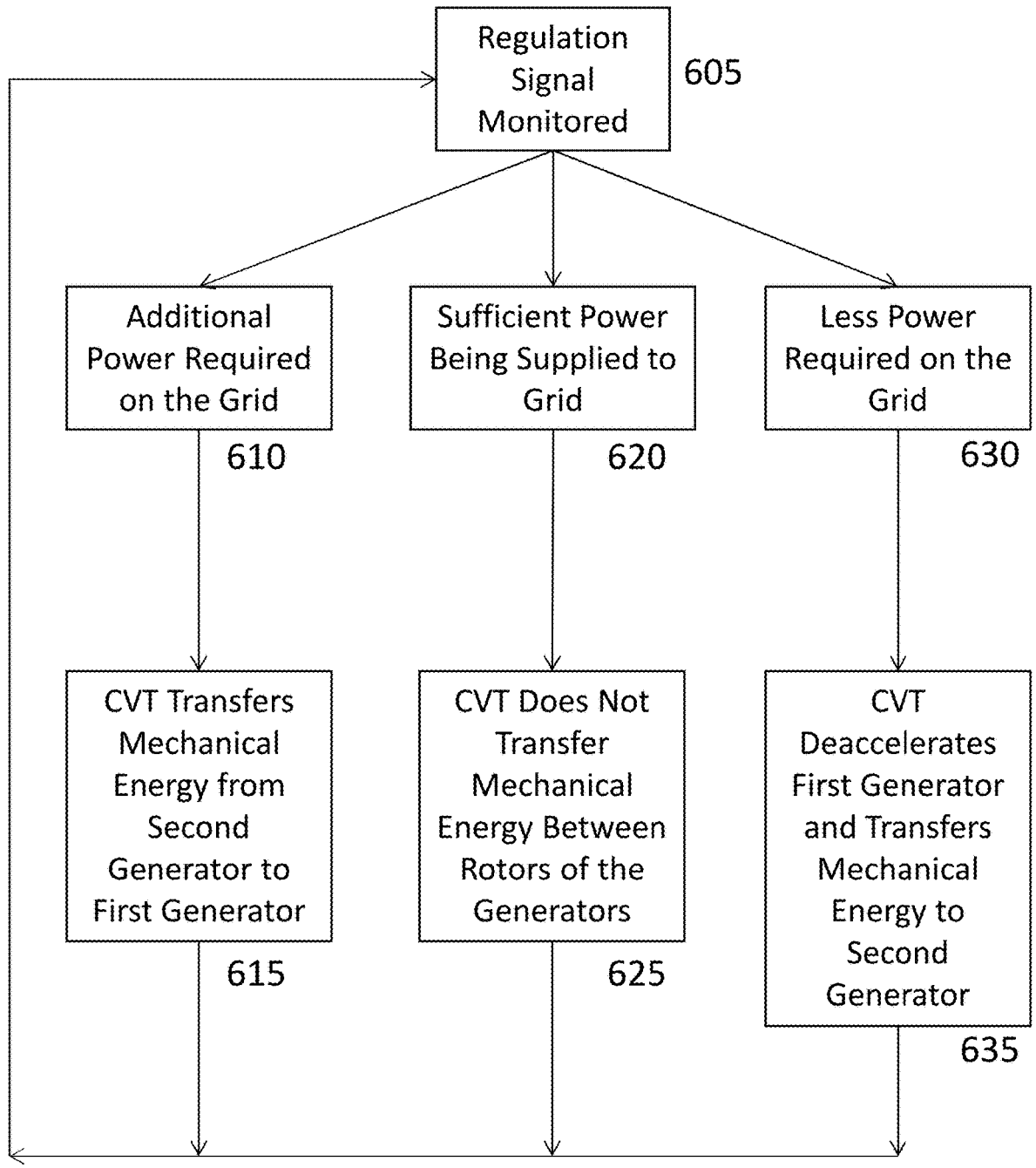
FIG. 6 is a flowchart representing the method of compensation using a continuous variable transmission according to an embodiment of the present invention.

With reference to FIG. 6, an example flowchart is provided to outline the method of voltage compensation. In an embodiment, the regulation signal is monitored at step 605. An example of a regulation signal is illustrated in FIG. 5. When the regulation signal senses that the grid requires more power, for example output current increases, at step 610, the CVT transfers the mechanical energy stored by the second generator to the first generator at step 615. When the regulation signal senses that sufficient power is being delivered to the grid, at step 620, the CVT remains unchanged at step 625. When the grid requires less power, for example generator current phase changes, at step 630, the excessive mechanical energy of the first generator is transferred to the second generator via the CVT, at step 635, to be stored as mechanical energy of the rotating second generator which increases its rotating speed. After the CVT is adjusted according to power requirements, the regulation signal is again monitored at step 605 and the process repeats. In an embodiment, positioning of the nominal rotating speed of the second generator at ~2900 rpm provides up to +/−4 MJ available to be delivered to the power grid via CVT or to be stored.

The above embodiments consider a configuration wherein a first generator is connected to the power grid and a second (or decommissioned) generator is connected to the first generator via a CVT. However, it should be readily understood that more than two generators may be linked in a similar manner. Furthermore, more than one of the generators may be connected to the power grid and/or a boiler and steam turbine system.

In an embodiment having an emphasis on reducing waste, the existing rotors (R) of generators 9, 210 are used as flywheels to store energy from the system as mechanical energy. In an embodiment, the some of the existing generators 9, 210 have been disconnected from the turbine system 204 and power grid system 208. In embodiments described herein, the connection between generators refers to a connection between the rotors of the generators provided with continuously variable transmission system provided.

In an embodiment, the generator which is connected mechanically to the turbine and electrically to the power grid has a rotor (R). The rotor (R) of that generator is connected mechanically to the rotors (R) of one or more additional generators via one or more continuously variable transmissions. In an embodiment, the one or more additional generators are not connected electrically to a turbine or to the power grid.

The invention has been described herein using specific embodiments for the purposes of illustration only. It will be readily apparent to one of ordinary skill in the art, however, that the principles of the invention can be embodied in other ways. Therefore, the invention should not be regarded as being limited in scope to the specific embodiments disclosed herein.

We claim:

1. A power grid stabilization system comprising:
a first generator mechanically linked to a turbine driven by a boiler and in electric communication with a power grid, the first generator having a rotor; and
a flywheel, wherein the flywheel is part of a second generator that is not in electrical communication with the power grid and does not generate electricity, wherein the flywheel is linked to the rotor of the first generator via a continuous variable transmission that transfers mechanical energy from the rotor of the first generator to the flywheel of the second generator where the mechanical energy is stored as mechanical energy in the rotation of the rotor of the second generator,
wherein the continuously variable transmission is configured to control the rotational speed of the rotor of the first generator to meet power requirements of the power grid by adding or removing mechanical energy to or from the flywheel in the second generator.

2. The system of claim 1, further comprising a turbine governor configured to maintain the turbine at a stable rotating speed.

3. The system of claim 1, wherein the continuously variable transmission transmits mechanical energy from the rotor of the first generator to the flywheel of the second generator when energy produced by the first generator exceeds the power requirements of the power grid.

4. The system of claim 3, wherein the continuously variable transmission transmits mechanical energy from the flywheel of the second generator to the rotor of the first generator when energy produced by the first generator does not meet the power requirements of the power grid.

5. A method of rapidly compensating for changing load requirements of a power grid, the method comprising the steps of:
providing electrical energy to the power grid from a first generator, the first generator having a rotor and being mechanically linked to a turbine driven by a boiler, the rotor of the first generator being also mechanically linked to a rotor of a second generator via a continuously variable transmission, wherein the rotor of the second generator is configured as a flywheel to store mechanical energy received from the first generator in the rotation of the flywheel-configured rotor of the second generator;
monitoring power consumption of the power grid;
monitoring power production of a first generator;
adjusting the one or more continuously variable transmissions to transfer additional mechanical energy from the flywheel-configured rotor of the second generator to the rotor of the first generator when the power consumption of the power grid exceeds the power production of the first generator; and
adjusting the one or more continuously variable transmissions to transfer additional mechanical energy from the rotor of the first generator to the flywheel-configured rotor of the second generator when the power production of the first generator exceeds the power consumption of the power grid.

6. The method of claim 5, wherein the turbine is a steam or gas turbine.

7. The method of claim 5, further comprising the step of governing the turbine such that it maintains a stable rotational speed.

8. A power grid stabilization system for use in stabilizing the output of a first generator in response to variable demands placed on the first generator by the power grid, wherein the first generator includes a first generator rotor mechanically linked to a turbine driven by a boiler and in electric communication with the power grid, the power grid stabilization system comprising:
a second generator rotor configured as a flywheel, wherein the second generator rotor is part of a second generator that is not directly mechanically linked to the turbine and is not in electric communication with the power grid; and
a continuously variable transmission connected between the first generator rotor and the flywheel-configured second generator rotor, wherein the continuously variable transmission is configured to transfer excess mechanical energy from the first generator rotor to the flywheel-configured second generator rotor when the output of the first generator exceeds the demand of the power grid on the first generator, wherein the excess mechanical energy is stored in the rotation of the flywheel-configured second generator rotor as kinetic flywheel energy that can be transferred back to the first generator rotor through the continuously variable transmission to stabilize the rotational speed of the first generator rotor in response to an increased demand by the power grid on the first generator.

9. The power grid stabilization system of claim 8, further comprising a turbine governor configured to maintain the turbine at a stable rotating speed.

10. The power grid stabilization system of claim 8, wherein the second generator is a decommissioned generator that was formerly connected to the power grid.

* * * * *